Aug. 13, 1957     W. E. STINE     2,802,475
APPARATUS FOR CLEANING EATING UTENSILS
Filed Aug. 31, 1953     2 Sheets-Sheet 1
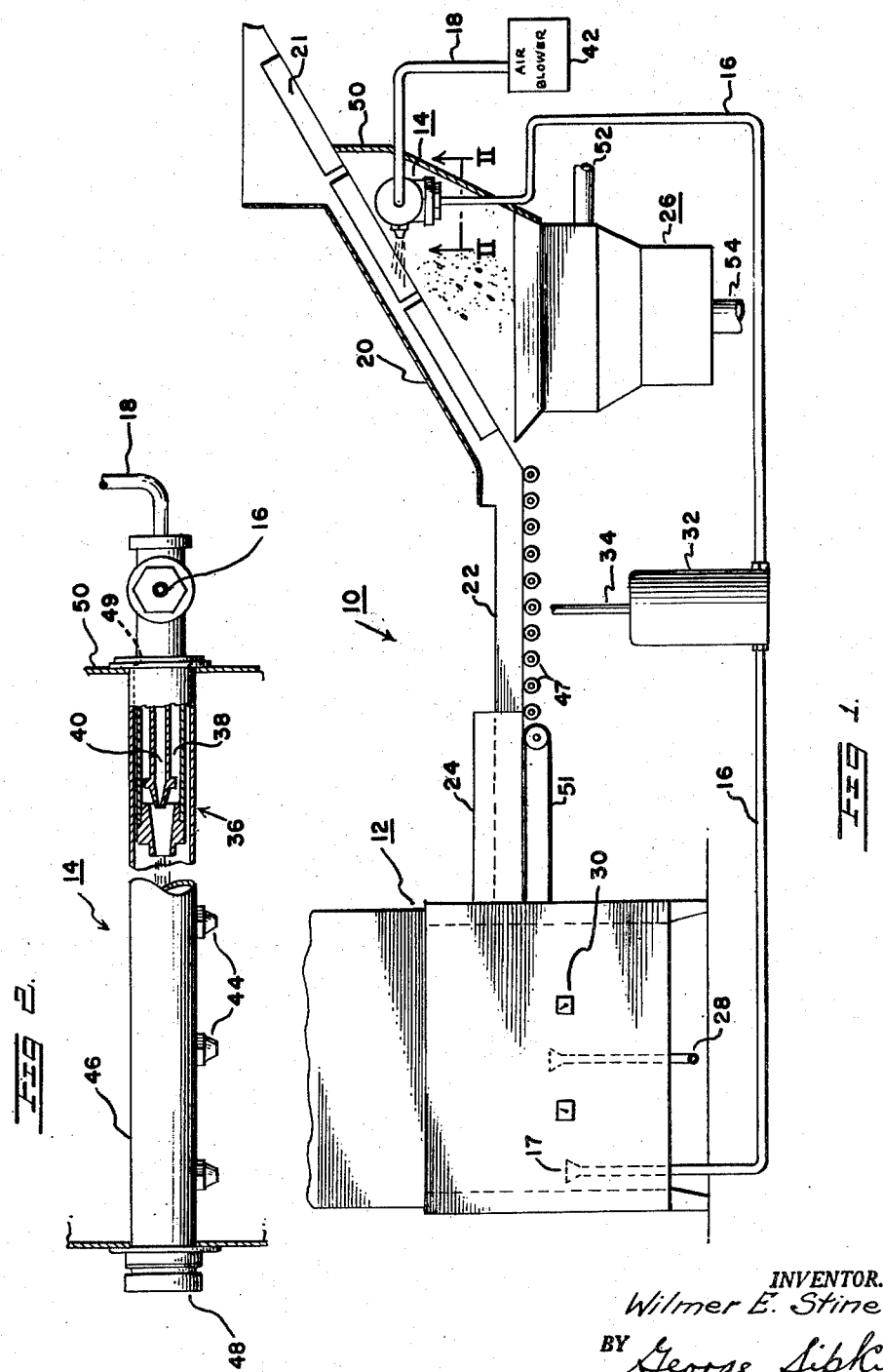
INVENTOR.
Wilmer E. Stine
BY George Sipkin
B. L. Zanguerll Aug. 13, 1957     W. E. STINE     2,802,475
APPARATUS FOR CLEANING EATING UTENSILS
Filed Aug. 31, 1953     2 Sheets-Sheet 2
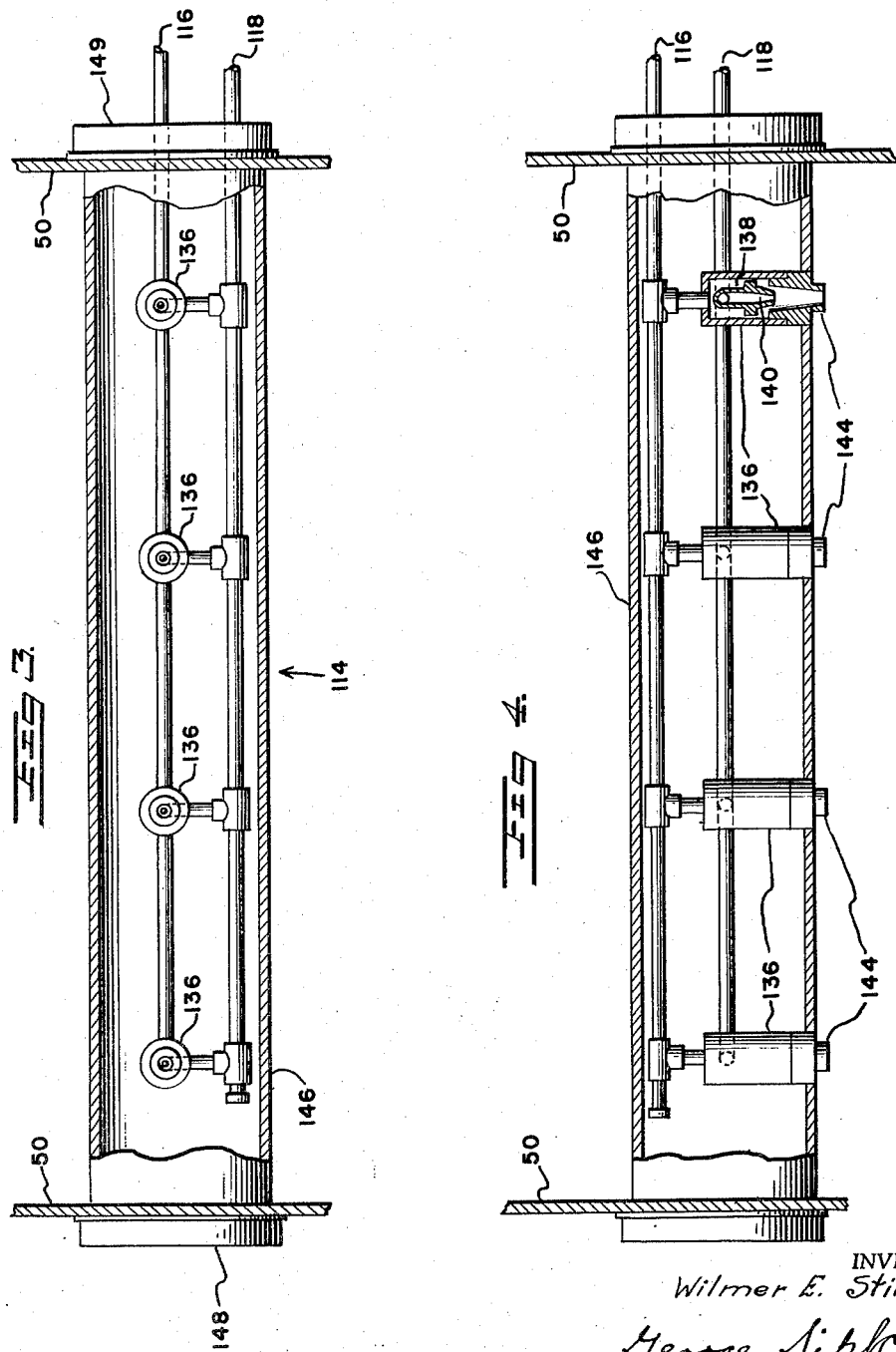
INVENTOR
Wilmer E. Stine
BY George Sipkin
B. L. Zanquell
ATTORNEY

United States Patent Office 2,802,475
Patented Aug. 13, 1957

2,802,475

APPARATUS FOR CLEANING EATING UTENSILS

Wilmer E. Stine, Washington, D. C., assignor to the United States of America as represented by the Secretary of the Navy Application August 31, 1953, Serial No. 377,738

7 Claims. (Cl. 134—60)

(Granted under Title 35, U. S. Code (1952), sec. 266)

The invention described herein may be manufactured and used by or for the Government of the United States of America for governmental purposes without the payment of any royalties thereon or therefor.

The present invention relates to a device for removing food scraps from eating utensils prior to washing and rinsing, and more particularly to an eductor arrangement which utilizes a gaseous medium to withdraw overflow water from another source and imparts thereto a high velocity which along with the gaseous medium impinges against the surface of eating utensils to remove excess food and waste therefrom.

Generally, dishwashing machines designed for large-scale commercial use, as opposed to domestic use, employ a water-circulating principle whereby the water is pumped from a main supply line to a plurality of radially extending spray manifold which have small orifices adapted to direct jets of cleansing water against dishes passing therethrough. The used and fouled water then is gathered and returned by the pump to the supply line to complete its recirculation. Thus, it is desirable to remove food particles, grease and other foreign substances from the water so as to avoid any clogging of the jet orifices of the spray-manifolds by the recirculating water.

In water-recirculating dishwashing machines, it can be readily seen that the efficiency of the operation depends on the ability to keep the spray-manifolds orifices free and unclogged. However, various methods utilize to draw off the foreign particles have been found to be economically impractical or inefficient in their attempt to achieve purification of the recirculating cleansing water.

Presently utilized methods for obtaining purification of the cleansing water consists, for example, of manually dumping the food from the eating utensils into a garbage can or garbage disposal unit. The eating utensils are then passed under a stream of water maintained by a recirculating pump or directly from a water supply system and commonly known as water scrapping or preflushing the soiled utensils. However, this method is considered unsanitary when it is part of a cafeteria line where each man processes his own eating utensils. Unless the flushing water is taken direct from the water supply system the same quantity of water is continuously used by the entire cafeteria line. In this latter case, the use of fresh water is excessive where economical operation is desirable. If the water is recirculated, complex screening methods must be provided to remove the coarser food particles, and sanitary conditions are such that one person must do all the water scraping or preflushing. Consequently, this person must be thoroughly trained in the necessity of washing hands as there will be a large build up of many types of bacteria and virus organisms flushed from the eating utensils of a large number of persons.

Another presently utilized method for achieving purification of the cleansing water and to provide a sanitary means for removing food particles adhering to eating utensils, such as compartment trays, plates, bowls, or the like, is to again manually dump the excess food from the utensils into a garbage can or disposal unit. The utensils are then dipped into a garbage can partially filled with a water and soap solution and having bristle brushes installed near the water level to further facilitate the removal of finer particles of food therefrom. In larger sculleries, as many as four cans may be used in succession in removing the excess food particles. As can be surmised, this method requires a considerable amount of space besides being very unsanitary and unsightly.

A further common method utilized to remove excess food from eating utensils prior to insertion in the dishwashing machine is to dump the excess food into a garbage can and feed the eating utensils directly into the dishwashing machine. This method results in rapidly building up in the wash water of the dishwashing machine a load of food particles which decrease the effectiveness of the detergent and often results in unsatisfactorily removing the food particles and improper sanitization of the eating utensils. Thus, this method although satisfactory for small sculleries where only a few people are served would not be satisfactory in a cafeteria line where a large number of people are served.

According to the teaching of the present invention, air, steam, or the like, operated eductors are arranged so that a selected quantity of overflow water is partially atomized to impart thereto a relatively high velocity for emission through a jet opening so that it impinges against the surface of the soiled eating utensils to thereby remove substantially all remaining food particles thereon. The food particles are made to fall or be discharged into a container or garbage disposal unit operative in a manner well-known in the art. Thus, the invention provides for the removal of excess food from the utensil without any sanitary hazard and without the personnel being exposed to any unsanitary installation. Also, the present invention utilizes a minimum of water, in most cases using only water which would have otherwise gone down the drain without further use. However, additional water may be fed into the system from a suitable water supply if the demand should ever arise.

The invention utilized in conjunction with a recirculating water type dishwashing machine or the like, prevents the rapid clogging of the rinsing jets, which are an important part of the washing operation, by the efficient utilization of the machine's overflow water to remove food scraps prior to washing and rinsing. Also, sanitary dishwashing facilities are provided by the automatic removal of food particles from eating utensils without the assistance of any attending personnel, and capable of providing satisfactory service in installations where a large number of people are served.

A object of the present invention is the provision of a sanitary means for removing food particles adhering to eating utensils prior to processing them thru a dishwashing and sanitizing machine.

Another object is to provide food scrap removal means wherein substantially all of the food scraps are removed from the eating utensils prior to washing and rinsing to thereby decrease the clogging of the rinsing jets of the dishwashing machine.

A further object of the invention is the provision of gaseous jet means for removing food scraps from eating utensils prior to washing and rinsing by utilizing the overflowing water from the washing machine.

Still another object is to provide gaseous jet means for removing loose scrap from eating utensils prior to washing and rinsing whereby efficient operation of said means is achieved without the requirement of considerable space and with a sanitary and attractive installation.

An object of the present invention is the reduction of food particles in the wash water of the dishwashing machine to thereby increase the effectiveness of the detergent therein for satisfactory scrap removal and sanitization of eating utensils.

Other objects and many of the attendant advantages of this invention will be readily appreciated as the same becomes better understood by reference to the following detailed description when considered in connection with the accompanying drawings in which like reference numerals designate like parts throughout the figures thereof and wherein:

Fig. 1 is a side view, partly in section, of a preferred embodiment of the invention;

Fig. 2 is a plan view, of a section of the device taken on the line II—II of Fig. 1 looking in the direction of the arrows;

Fig. 3 is a side view, partly in section, of a modification of the jet arrangement shown in the preferred embodiment of Fig. 1; and Fig. 4 is a plan view, partly in section of the modified jet arrangement shown in Fig. 3.

Referring now to the drawings, there is illustrated a preferred embodiment 10 comprising a dishwashing machine 12, preferably of the conveyor type, with a jet arrangement 14 operatively coacting therewith. The jet arrangement 14 is connected through a rinse water pipe 16 to a source of overflowing rinse water in the dishwashing machine 12, as hereinafter described. The jet arrangement is provided with an intake for a gaseous substance, such as air, steam, or the like, to actuate the jet or eductor action of the unit 14.

An open inverted conveyor 20 is connected through an intermediate table 22 to a belt-conveyor 24 integrally coupled to the dishwater 12. The conveyor 20 is suitably opened on the bottom to provide the trays 21, plates, or the like, conveyed face down thereon to be exposed to the eroding action of the gaseous medium emitted from the jet arrangement 14. Food particles removed from the conveyed trays will be deposited in a garbage grinder 26 located immediately beneath the conveyor 20 and the jet arrangement.

The dishwashing machine 12 is provided with an overflow drain pipe 28 to normally remove the rinse water from the dishwasher when such water reaches a predetermined level, which level is indicated by conventional indicating devices 30. The rinse water pipe 16 has its inlet 17 within the dishwashing machine at a suitable height below the intake of the overflow drain 28 as to enable the rinse water above a certain height to initially overflow into the pipe 16. In this manner, the overflow from the rinse tank of the dishwashing machine may be utilized as a source of hot water in the jet arrangement 14. Thus, since this source of rinse water usually overflows into the drain 28, an economical source of water for the jet arrangement 14 is readily obtained.

The rinse water overflowing into the pipe 16 is accumulated within a water reservoir 32 suitably coupled between the dishwashing machine 12 and the jet arrangement 14, to thereby provide said jet arrangement with a sufficient reservoir of hot rinse water. The reservoir 32 is provided with an air vent 34 to bleed therefrom an excess of air pressure present therein. Due to the obvious effect of gravity, the rinse water in the pipe 16 will attain therein a level corresponding to the level of the intake 17 of said pipe within the dishwashing machine 12.

The jet arrangement 14 is provided with an eductor 36 having its outer duct 38 coupled to the rinse water pipe 16 and its inner duct 40 coupled to a gaseous medium thru a pipe 18. The gaseous medium to actuate the eductor may be air, steam, or the like, depending on the source available for the particular installation. In the preferred embodiment, air is utilized from a high pressure blower 42. However, any suitable source of air, such as from a high pressure air line or from a special air compressor can be adapted for use in the invention. In the absence of a source of air, steam may be utilized in lieu of air.

The action of the eductor 36 is to withdraw the hot rinsing water, from the dishwashing machine 12, thru the pipe 16 and to mix it with the air from the blower 42 to impart to the mixture a relatively high velocity. It is to be understood that if water is not available in the dishwashing machine at the height of the inlet of the rinse water pipe 16, the high velocity air stream emitting through the eductor 36 would momentarily suffice until the water supply is replenished. Thus, the air and water mixture, or air alone, is emitted from the eductor 36 at high velocity into a surrounding closed-ended tubular member 46 having spray nozzles 44 provided thereon. The high velocity imparted to the eductor mixture will cause said mixture to be forcibly emitted through the nozzles 44 in a high velocity spray that impinges on the trays 21 passing by the jet arrangement 14 on the conveyor 20.

The tubular member 46 is provided with a sealed end 48 and an open end 49 wherein is secured the inward projecting eductor 36. The spray nozzles 44 are spaced along the circumferential surface of the tubular member 46 so as to suit the particular application involved. For example, spacing of the jets will depend upon the size of the conveyor 20 and the rate at which the trays on said conveyor pass the jet arrangement 14. The spray nozzles 44 are of a suitable design to provide a spray of sufficient density to have a considerable eroding action on the food particles on the trays.

The open conveyor 20 is of a suitable design to permit the trays 21 to be progressively placed thereon in an inverted position so as to continuously pass thru the jet of air-water emanating from the spray nozzles 44. After the trays leave the conveyor 20, they are conveyed by rollers 47, secured to the table 22, to the belt-conveyor 24. The belt-conveyor is provided with a moving tray belt 51 which continuously passes the trays thru the dishwashing machine 12.

The garbage grinder 26 wherein the excess food particles dump from the trays or removed therefrom by the eroding action of the spray nozzles 44, is surrounded by a shroud 50 to prevent the sprayed air-water mixture and food particles from being deflected from the entrance of the garbage grinder. The liquid medium utilized as a vehicle in the garbage grinder 26 may be any liquid available in the particular installation at hand. For example, for shipboard installation of the unit 10, salt water may be utilized and taken thru the intake 52 and expelled, with the garbage, thru the outlet 54.

In operation, the preferred embodiment 10 utilizes an air operated eductor 36 so arranged that it takes through the pipe 16 a selected quantity of hot rinse water overflow from the dishwashing machine 12 and partially atomizes it thru the action of the air under pressure transmitted through the pipe 18 from the air blower 42. The eductor imparts to the air a relatively high velocity and forces the mixture of air and water to be emitted thru the spray nozzles 44 as jets that impinge against the surface of the soiled eating utensils, on the conveyor 20, to remove substantially all remaining food particles located thereon.

The removed food particles fall or are discharged into the garbage grinder 26 to be suitably discharged therefrom through the outlet 54. After the plates or trays 21 have passed thru the eroding action of the jet arrangement 14, they slide on to the table 22 due to the force of the preceding trays. Thru the action of the rollers 46 and the tray belt 48 the substantially soil-free trays are placed on the dishwashing machine conveyor 24 directly or may be stacked in a rack which is subsequently conveyed to the dishwashing machine 12. It is to be understood, that other suitable methods of conveying the trays past the gaseous jets may be used to suit the particular installation and the type of trays or eating utensils utilized.

Figs. 3 and 4 illustrate a modification of the jet arrangement 14 shown in the preferred embodiment of Figs. 1 and 2. The modified jet arrangement 114 is provided with a tubular member 146 having closed ends 148 and 1149. The end 149 is formed with a number of apertures to provide an inlet for the air conveying pipe 116 and for the rise water pipe 118. The air and rinse water pipes are coupled to eductors 136 for mixing the air and water to provide for the eroding action of the sprays from the eductor nozzles 144 on the food particles adhering to the trays. In the modification, each eductor 136 is coupled to the air pipe 116 thru the duct 138, and to the rinse water pipe 118 thrus the duct 140.

The modification illustrated in Figs. 3 and 4 is functionally no different than the jet arrangement 14 already described in connection with the preferred embodiment of Figs. 1 and 2. In either modification the operation of the jet arrangement is such that a gaseous medium such as air, steam, or the like, is used to withdraw the dishwashing machine's rinsing water overflowing to the pipe 16, and to impart to said water a high velocity to produce a gaseous jet which impinges against the eating utensils to efficiently and mechanically remove excess food particles therefrom.

It can be readily surmised that the present invention provides a method of removal of excess food in one operation. For example, the preferred embodiment 10 can be installed in a cafeteria line where each person starts the process of removing the excess food from his eating utensils without any sanitary hazards and without the personnel being exposed to unsanitary conditions. The jet arrangement 14 utilizes a minimum of water, in most cases only water which would have otherwise gone down the drain without further use. In case water is temporarily not available at the height of the rinse water intake pipe in the dishwashing machine, air alone will suffice to remove the excess food from the trays.

Obviously many modifications and variations of the present invention are possible in the light of the above teachings. It is therefore to be understood, that within the scope of the appended claims, the invention may be practiced otherwise than as specifically described.

What is claimed is:

1. In a device for removing food scraps from eating utensils prior to washing and rinsing in a water-recirculating dishwashing machine comprising, a conveyor having an exposed bottom portion adapted to expose soiled surfaces of the eating utensils conveyed thereon, a garbage disposal means having a disposal opening beneath said exposed bottom portion, shroud means secured to and surrounding said conveyor and said disposal opening to thereby guide food scraps into said disposal opening, a tubular member secured to said shroud means and transversely spaced from said exposed bottom portion, said tubular member having an eductor secured thereto, said eductor having a fluid intake means, a rinse water intake means and discharge means for impinging a mixture of fluid and water against said utensils, said discharge means being so constructed and arranged relative to said utensils, said shroud and said garbage disposal means as to direct a mixture of fluid and water against said utensils in a manner as to remove said food scraps from said utensils for gravity flow along with said mixture into said garbage disposal means.

2. The invention as defined in claim 1 but further characterized by means for supplying said fluid intake means with a high velocity gas for imparting a high velocity to the rinse water and for expelling a high velocity mixture of rinse water and gas from said eductor into said tubular member, and said discharge means comprising said tubular member having spray nozzles for spraying the high velocity mixture of rinse water and gas within said tubular member toward said exposed bottom portion for removing the food scraps from the soiled surfaces of the eating utensils.

3. In a device for removing food scraps from eating utensils prior to insertion in a dishwashing machine provided with an overflow drain comprising, a conveyor for carrying eating utensils in a face downward position, means connecting said conveyor with said dishwashing machine, garbage disposing means having a shroud associated with said conveyor, jet means secured to said shroud and spaced between said conveyor and said garbage disposing means, pipe means including reservoir means adapted for coupling said dishwashing machine to said jet means for supplying overflow rinse water thereto, said pipe means having an intake within the dishwashing machine at a predetermined point below the dishwashing machine's overflow drain to thereby supply the jet means with rinse water that would otherwise flow into a drain, and a gaseous medium supply associated with said jet means, whereby the action of said gaseous medium when traversing said jet means creates a suction effect on said rinse water from machine thereby causing a mixture of gaseous medium and rinse water to be directed against said utensils.

4. An apparatus for removing food scraps from eating utensils prior to washing and rinsing in an automatic dishwashing machine comprising a conveyor having an exposed bottom portion for moving eating utensils in an inverted position thereon, a jet arrangement associated with said exposed bottom portion for removing food scraps from the eating utensils, a rinse water conduit having an intake within said dishwashing machine and having its discharge end connected to said jet arrangement for supplying rinse water thereto, a gaseous medium supply means having a gaseous medium conduit coupled to said jet arrangement for drawing the rinse water from said dishwashing machine and imparting a high velocity thereto prior to discharging same against said eating utensils.

5. The invention as defined in claim 4 but further characterized by said jet arrangement comprising a tubular member having a closed end and an open end, an eductor projecting into said tubular member through said open end and secured thereto, said eductor having an inner duct coupled to said gaseous medium conduit and an outer duct coupled to said rinse water conduit, said tubular member having a plurality of spray nozzles secured thereto for directing a mixture of rinse water and gaseous medium upon the eating utensils.

6. The invention as defined in claim 6 but further characterized by said jet arrangement comprising a tubular member having a first closed end and a second closed end, said second closed end having a first aperture and a second aperture, said gaseous medium conduit projecting into said tubular member through said first aperture and mounted therein, said rinse water conduit projecting into said tubular member through said second aperture and mounted therein, a plurality of eductors secured within said tubular member, each of said eductors having a nozzle protruding from the circumferential surface of said tubular member, and means respectively connecting said gaseous medium conduit and said rinse water conduit to each of said eductors, whereby gaseous medium flowing through said eductors imparts a high velocity to said rinse water prior to expelling the latter against said eating utensils.

7. A device for removing food scraps from eating utensils as set forth in claim 1 which includes a plurality of eductors secured to said tubular member and projecting through the outer surface thereof, rinse water conduit means connected at one end to each of said eductors and adapted for connection at its other end to said machine, and gas conduit means connected to each of said eductors for creating a suction in said eductors thereby drawing rinse water from said machine and expelling same against said utensils at a high velocity.

References Cited in the file of this patent

UNITED STATES PATENTS

| | | |
|---|---|---|
| 898,954 | Baker et al. | Sept. 15, 1908 |
| 1,017,533 | Goodlett | Feb. 13, 1912 |
| 1,144,023 | Beutlich | June 22, 1915 |
| 1,281,864 | Sparr | Oct. 15, 1918 |
| 1,720,622 | Breton | July 9, 1929 |
| 2,644,473 | Fox et al. | July 7, 1953 |